(12) United States Patent
Youngblood

(10) Patent No.: US 10,379,718 B2
(45) Date of Patent: Aug. 13, 2019

(54) SYSTEM AND METHOD FOR PROVIDING AMBIENT INFORMATION TO USER THROUGH LAYERED VISUAL MONTAGE

(71) Applicant: Palo Alto Research Center Incorporated, Palo Alto, CA (US)

(72) Inventor: Gregory Michael Youngblood, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 41 days.

(21) Appl. No.: 15/853,434

(22) Filed: Dec. 22, 2017

(65) Prior Publication Data

US 2019/0196694 A1 Jun. 27, 2019

(51) Int. Cl.
*G06F 3/048* (2013.01)
*G06F 3/0484* (2013.01)
*H04N 21/854* (2011.01)
*H04N 21/845* (2011.01)

(52) U.S. Cl.
CPC ..... *G06F 3/04842* (2013.01); *H04N 21/8456* (2013.01); *H04N 21/854* (2013.01)

(58) Field of Classification Search
CPC ..... H04N 13/00; A63F 13/655; G06F 3/0484; G06F 3/048; G06T 15/60
See application file for complete search history.

(56) References Cited

U.S. PATENT DOCUMENTS

| | | | |
|---|---|---|---|
| 5,915,044 A * | 6/1999 | Gardos | G06T 9/001 382/232 |
| 9,824,296 B2 * | 11/2017 | Yamanaka | G06K 9/6201 |
| 2012/0136762 A1 * | 5/2012 | Wissenbach | G06Q 30/02 705/30 |
| 2015/0018040 A1 * | 1/2015 | He | H04M 1/72522 455/558 |
| 2016/0210773 A1 * | 7/2016 | Kim | G06F 3/04845 |
| 2016/0225183 A1 * | 8/2016 | Lee | G06T 11/001 |
| 2017/0056775 A1 * | 3/2017 | Barber | A63F 13/213 |
| 2017/0161870 A1 * | 6/2017 | Clarke | G06F 3/0488 |
| 2017/0294000 A1 * | 10/2017 | Shen | G06T 11/001 |
| 2018/0052568 A1 * | 2/2018 | Angadimani | G09G 5/377 |
| 2018/0063504 A1 * | 3/2018 | Haines | H04N 13/156 |

\* cited by examiner

*Primary Examiner* — Rashawn N Tillery
(74) *Attorney, Agent, or Firm* — Shun Yao; Park, Vaughan, Fleming & Dowler LLP

(57) ABSTRACT

Embodiments described herein provide a system for generating a visual montage. During operation, the system may determine a plurality of layers in the visual montage. A respective layer is associated with a time range and a plurality of predetermined slots for assigning graphical objects. The system may obtain data representing a set of graphical objects and constraints associated with the graphical objects. The system may then obtain information associated with an event and a respective time from an ambient environment of a user. The system may determine that the respective time is within the time range of a specific layer. The system may assign at least one graphical object to the specific layer according to the constraints associated with the graphical object to generate the visual montage. The system may then display the visual montage with the graphical object representing the event on a display screen.

20 Claims, 10 Drawing Sheets

SYSTEM AND METHOD FOR PROVIDING AMBIENT INFORMATION TO USER THROUGH LAYERED VISUAL MONTAGE

BACKGROUND

Field

This disclosure is generally related to user interfaces. More specifically, this disclosure is related to a method and system for providing ambient information to a user through a layered visual montage.

Related Art

Computing devices, including mobile devices, smartwatches, smart televisions, and desktop computing devices, may present information to a user with an interface that allows the user to quickly comprehend important information. For example, a smartwatch may present information to a user with a glance interface, which means that the user can quickly comprehend important information with a brief glance at the watch. Mobile devices may utilize interfaces which users are likely to interact with for a longer time, although both glance interfaces and mobile interfaces typically have short session times to engage the user and convey information. Users typically engage with glance interfaces for 5 seconds or less with a single context after navigating for information (e.g., time, status). Mobile interfaces typically have mobile session times that are less than 90 seconds for a single session, and often with multiple contexts (e.g., check info, read, comment, etc.).

One problem with existing interfaces is that many applications contain several aspects such as activity reporting, sensing/tracking, social, and other events that need to be conveyed to the user in a quick, efficient, and engaging manner. Users may not want to view multiple dashboards with dial instruments and numbers. Users also may not want to constantly receive notifications or have all of their icons adorned with badges vying for their attention. These create significant visual clutter and do not inform the user in a quick, efficient, and engaging manner.

SUMMARY

Embodiments described herein provide a system for generating a visual montage. During operation, the system may determine a plurality of layers in the visual montage. A respective layer is associated with a time range and a plurality of predetermined slots for assigning graphical objects. The system may obtain data representing a set of graphical objects and constraints associated with the graphical objects. The system may obtain information associated with an event and a respective time from an ambient environment of a user. The system may then determine that the respective time is within the time range of a specific layer. The system may assign at least one graphical object to the specific layer according to the constraints associated with the graphical object to generate the visual montage, and display the visual montage with the graphical object representing the event on a display screen.

In a variation on this embodiment, the system may determine rules which specify responses to user interaction with one or more graphical objects. In response to receiving user input interacting with a selected graphical object, the system may execute a rule associated with the selected graphical object to provide a response to the user.

In a variation on this embodiment, the system may control a device represented by a graphical object in response to receiving user input interacting with a selected graphical object.

In a variation on this embodiment, the system may move a graphical object to another layer of the visual montage in response to determining a change in a time associated with a specific graphical object.

In a variation on this embodiment, the plurality of layers include at least a foreground layer, a middle ground layer, and a background layer, each layer is associated with a time range, and the foreground layer is associated with a most recent time range, and the background layer is associated with a least recent time range In a further variation, the system may, in response to determining that a difference between a current time and a time associated with a second event is decreasing, move a graphical object from another layer to the foreground layer. In response to determining that a difference between the current time and a time associated with the second event is increasing, the system may move the graphical object from the foreground layer to a different layer.

In a variation on this embodiment, the system may assign at least one graphical object to an ornament slot associated with a layer.

In a variation on this embodiment, the system may determine rules which specify how to transition between states for a sublayer of a respective layer.

In a variation on this embodiment, the system may receive user preference data indicating a type of information to display on the visual montage, wherein the information is associated with at least one of an event, an activity, a deadline, a user-specified logic function, and a communication from an application.

In a variation on this embodiment, the system may perform at least one of a temporal-to-spatial mapping, a spatial-to-spatial mapping, and a logical-function-to-spatial mapping from information associated with the ambient environment to the visual montage.

BRIEF DESCRIPTION OF THE FIGURES

In the figures, like reference numerals refer to the same figure elements.

DETAILED DESCRIPTION

Figure 1:
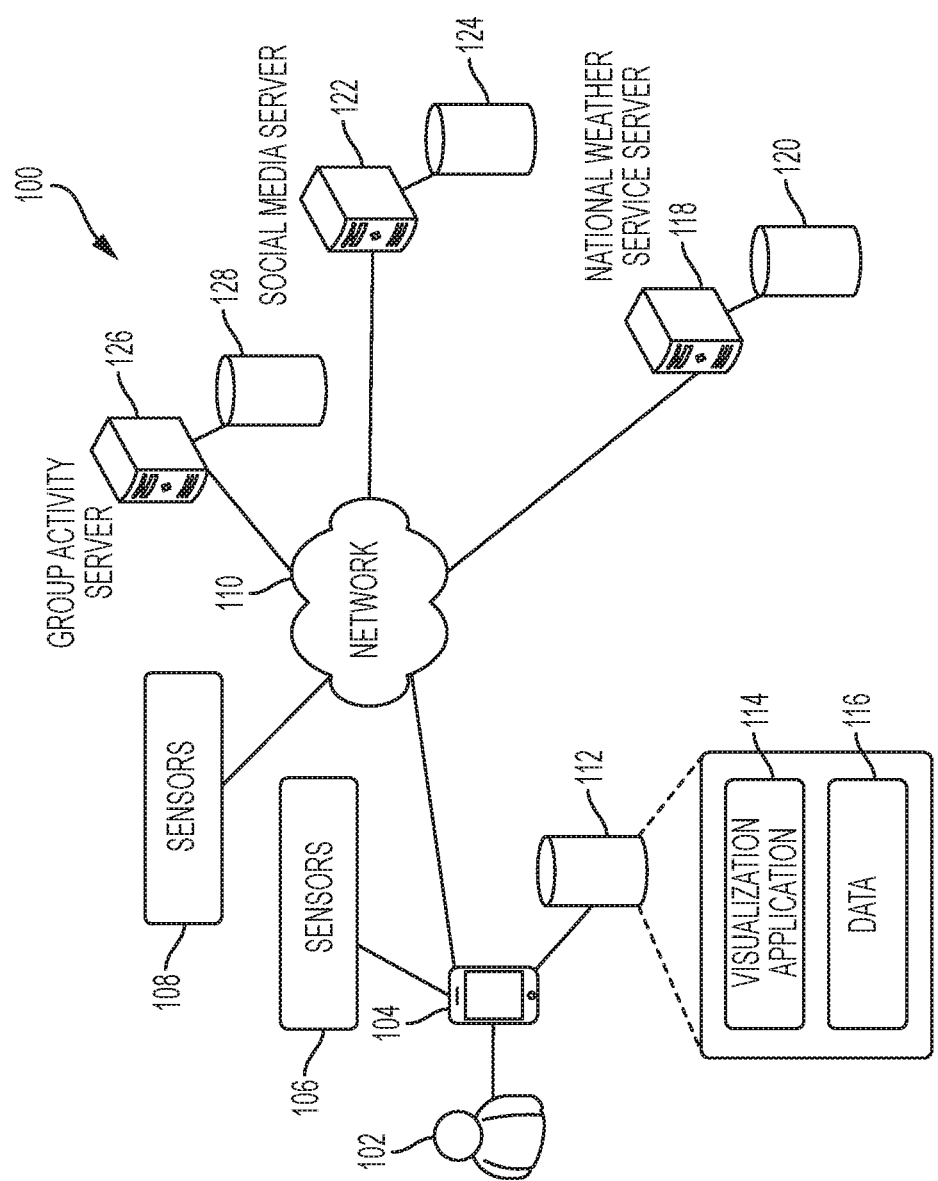
FIG. 1 presents a block diagram illustrating an exemplary system for providing ambient information through a layered visual montage, in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments described herein solve the problem of improving glance interfaces by generating a visual montage with multiple layers based on ambient environment information associated with a user (e.g., a viewer of the visual montage). The multiple layers may each be associated with a respective time range and a set of ornaments representing states, events, people, activities, and/or any other information or concepts from the ambient environment to be presented. The ambient environment includes both the digital and real world surrounding a user, which includes, for example, the user's geographic location and physical surroundings, the local weather, the user's social activity data, and information from the user's mobile applications.

A visualization system may position an ornament in a layer to indicate an association between a time range corresponding to the layer and the information represented by the ornament. Each layer may be associated with multiple ornament slots for placing ornaments, a time range determined relative to the time that the user is viewing the montage, a background image, and/or a degree of importance. The layers may also be associated with a defined draw order for the layers and/or any included sublayers.

An ornament is a graphical object that can be composited in different combinations onto the environment depicted in the visual montage so as to represent, for example, a state, real-world object, people, activity, and/or event from the ambient environment. Ornaments may also be referred to as graphical objects. An example of an ornament is a picture of three people having a conversation. The system may use the layers and multiple ornaments to generate a visualization that can quickly convey information that is relevant to the viewer. With the layers and ornaments, the system can convey a large amount of information with a relatively small set of interchangeable graphical elements.

The system may generate the visual montage by assigning ornaments to ornament slots in the layers and/or sublayers. The system may define rules and associated thresholds for placing the ornaments at ornament slots during the visualization process. The system may choose an ornament from a set of ornaments to place into an ornament slot. The system may display ornaments that represent everyday objects which are familiar and meaningful to the viewer. For example, the system may display an ornament representing a sign with a written message to notify the user of the message. The system may also display an ornament representing a group of people having a conversation to indicate that people associated with the user's social group are participating in a conversation.

The placement of an ornament within a layer means that the event (or conversation or other activity or state) associated with the ornament occurs within the time range associated with the layer. The time range may be in the past or future relative to the current viewing time. For example, the system may place an ornament representing a sign with the words "party coming up in 12 hours" in the background layer. Eight hours later, the system may place an ornament representing a sign with the words "party coming up in 4 hours" in the foreground layer. Eight hours after the party, the system may place an ornament representing a sign with the words "party occurred 8 hours ago" in the middle ground layer.

In some embodiments, the layers may include a foreground layer, a middle ground layer, a background layer, and a sky layer. The system may generate, store, and/or use background images for the various layers. The foreground layer may represent the most recent time range and the background layer may represent the most distant time in the past or in the future. That is, the distance of a layer from the bottom (e.g., foreground layer) of the visual montage corresponds to a time in the past or future. For example, the foreground layer may be associated with the present time, while the middle ground layer may be associated with a time range occurring approximately one week ago or one week in the future. The background layer may be associated with a time range occurring approximately two weeks ago or two weeks in the future. The system may move an ornament from the background layer to the foreground layer to indicate that the state, activity, and/or other information associated with the ornament is coming up in time. Similarly, moving the ornament from the foreground layer to the background layer indicates that the state, activity, and/or other information associated with the ornament is fading into the past.

Each layer may also be associated with a degree of importance. The ornaments displayed in the foreground layer may be more important to the user than the background layer. For example, the system may display a coach ornament on the foreground layer and a group discussion with people talking in the background layer. The coaching session may be more important to the user than the group discussion.

The system may have a defined draw order for the layers and/or any sublayers. The system may freely place a sublayer or the sublayer may follow a function for moving across a layer. For example, the system may display a sublayer with a sun that is moving across a sky layer.

The system may also annotate the ornaments, such as displaying a banner with a message relating to events, people, or other topics of interest from the ambient environment to the user. Annotations may also include a narrative (a story) presented through multiple images over time. For example, the system may replace an ornament representing two people displayed in the middle ground layer with an ornament representing eight people in the foreground layer. This tells a story to the viewer that the number of people participating in the conversation is increasing over time.

The system may receive user input to interact with elements displayed on the visual montage. For example, the user may tap on an ornament to view a social media feed or the user may touch an ornament representing a thermostat to adjust the room temperature.

Mapping from Ambient Environment to Visual Montage

When generating the visual montage based on the ambient environment, the system may perform temporal-to-spatial mapping, spatial-to-spatial mapping, and/or logical-function-to-spatial mapping. The system may cluster different information from the ambient environment and map the clustered information to spatial relationships within the visual montage. The system may define thresholds for mapping from clusters of information to the graphical objects. The system may automatically determine clustering configuration information for the user and/or receive user input specifying preferences for the clustering of the information.

The system may perform temporal-to-spatial mapping from the ambient environment to the visual montage. For example, the system may map two meetings occurring at different times to different layers of the visual montage.

The system may perform spatial-to-spatial mapping from the ambient environment (e.g., real-world surroundings) to the visual montage. For example, the visual montage may include depictions of conference rooms at a business and transitions in the montage to various other places associated with the business. An office worker can view all the meetings occurring in conference rooms on the visual montage, including which rooms recently had meetings that are finished.

The system may also perform a logic-function-to-spatial mapping from the ambient environment to the visual montage. The system and/or user can define the logic function and how the system clusters the information. One can specify the parameters of the logic function and/or rules associated with the logic function. For example, the user may specify a preference for mapping common spaces versus private spaces to the visual montage. For example, the system may group different technology groups of an enterprise together for display in a visual montage. The system may display the different technology groups in the different layers of the visual montage.

The system may personalize mapping from the environment to the visual montage according to each person's preferences. The system may determine the identity of the user and generate the visual montage specifically for the user. The system may learn the user's preferences through machine learning or through user configuration input.

Visualization

To facilitate quick comprehension, visualization should provide a sense of the primary message at a momentary glance and afford additional introspection for secondary messages and other messages as time allows. For instance, if there is a lot of social activity occurring in a represented application such that the social activity is of primary importance, then the visualization should make that aspect very clear. If the user perceives through the visualization that there is a lot of social activity occurring then the user may wish to engage with that social activity. Thus, the system provides information that leads to desired user interaction.

In any given application there is a set of core activities and an ordering of these activities that the system may focus the user's attention on. This focus may be biased by user preference and taken into account by the system. For example, if the user is more introverted and does not engage in social activities, in the scenario above the system may focus the visualization on a different primary message. This primary message should be one that is more useful and engaging to the user. The user should be able to understand the primary message with a quick, single glance of the visualization. The user may also inspect further to view secondary messages and other messages of less importance.

Efficient visualization makes use of best practices in semiotics by ensuring that the semantics between signs and the elements to which the signs refer are clear to the user so that the user can grasp their signified meaning rapidly without a significant burden of interpretation. There are many ways to accomplish this such as using real world signs, symbols, and situations. For example, the shape and color of a stop sign is internationally consistent and easily recognizable. Another example is the system may use learned symbols from a specific application and incorporate the learned symbols in the visualization. The system may even train the user on more complex interfaces. Some systems may also be adapted to accommodate potential issues that may make interpretation difficult for a user. For example, the system may modify display colors to be viewable by users that are red-green color blind.

Visualization can engage the user in three ways including aesthetic (perceptual), narrative (annotative), and/or interactive (collaborative). A highly engaging visualization provides a perceptually pleasing presentation that should tell a story and provide some level of interaction.

All of these factors may vary on the target population and should be tested within the populations to maximize these factors. However, a framework is needed to guide such explorations. Within a specific visualization there may be a number of sub-problems that may arise depending of the form of the data presentation. These sub-problems may include, but are not limited to, conveying the passage of time, conveying a sense of the importance order, and/or drawing attention to user-specific elements with a larger group context (can be considered a multiple primary attention getting problem). Overall, there is also the problem of defining constraints while maintaining expressibility given the limitations of how the visualization is created. For procedurally drawn visualizations this may not be a significant problem as the burden of creation relies mostly on the machine drawing within defined constraints. However, defining the constraints may be difficult. When sets of artist-created illustrations are part of the visualization, maintaining high expressibility with limited drawings may be difficult. Current solutions to such problems are typically implemented on a case-by-case basis by the creator(s) often in an ad-hoc fashion, but guided by previous forms and design guidelines from various sources. The techniques outlined significantly reduce these problems by providing a framework to directly address some, while defining boundaries for others to make them tractable.

Visualization Framework

The visualization procedural framework disclosed herein 1) represents tiered focus elements and supports multiple same tier elements; 2) supports the use of well-understood representations; 3) provides for engaging presentation through perceptual, annotative, and collaborative methods; and 4) maximizes expressibility through minimal sets for composition.

The layered visual montage provides a means to define visual constraints for stacked layers. Each layer may be associated with temporal or importance aspects in the overall composition of the visual montage.

Each constraint layer may have a defined draw order both within the global set of layers and within the sublayers, an associated background or base imagery area, and may be associated with guidance and constraints on where to place graphical objects within that layer (e.g., sublayers). Associated with each layer are ornament slots (e.g., may also be referred to as ornament sites) which may guide the placement of objects. These ornament slots provide opportunities for object placement and may define the constraints for the specific ornaments placed there. These constraints may be related to other artifacts of the layer, such as the background. The system may freely place sublayers or a sublayer may follow a function for placement (e.g., a sun may transit the sky). In some compositions layers on top of or in front of other layers may contain illustrative objects that occlude portions of lower layers. In this case, the system may annotate the occlusion boundaries as constraints for the affected layers. Furthermore, different embodiments may include layers that vary from the layers described herein.

Layer organization and/or size can provide the illusion of depth or significance. Larger objects or objects that appear closer to the user tend to get noticed more easily and are thus considered more prominent, and these objects may be the only objects that leave an impression. Multiple objects on the same tier of equal size and aesthetic quality can provide a meaning of equivalent prominence. The system may also use the tiered organization to represent temporal aspects such as upcoming events that get closer and closer to the user or past events that fade off into distant layers over time. Additionally, unique graphic elements or graphical elements that call out the user specifically (e.g., showing their picture or using their name) may provide different or personal contexts to visual messages within the setting of a different global context or set of contexts.

The framework can support any representation that can be presented visually by using the graphical objects to generate a composition. While not limited to a storytelling form, graphical objects that convey a story or a story over time can be more narrative in the conveyed visual message. The system may adapt the displayed graphical objects according to the cultural or regional understanding of the party viewing the visual montage. In some scenarios, the interpretation of the displayed graphical objects may vary by group based on factors such as culture and geographic region.

In scenarios where this framework is applied in a medium that supports interaction, the system may associate graphical objects with interactive receptors that respond to appropriate types of user interaction. For example, the user interaction may include, but is not limited to, touch, gaze, smell, directed speech, gesture, force, etc. One or more functions may receive as input the sensed interactions and in response to the sensed interactions control elements (e.g., light switch or light dimmer) outside of and/or within the visual montage.

For example, touching a graphical object that represents the light level of a space may cause the ambient light level of the actual environment hosting the visual montage to change or directing speech at a graphical object may cause the graphical object to change state. For example, the graphical object may react by displaying an indication of increased attention to the user.

By allowing subcomponents to be re-usable or easily manipulated through various transformations (e.g., size, color, sub-composition) across layers, the system may create layers and elements of layers which maximally utilize the combinatorial effects of composition. This may reduce authorial burden and maximize the expressiveness of a montage.

Exemplary Visualization System

FIG. 1 presents a block diagram illustrating an exemplary system 100 for providing ambient information through a layered visual montage, in accordance with an embodiment. A user 102 may operate a mobile device 104. Mobile device 104 may include internal sensors and can also access other sensors such as external sensors 106 and sensors 108 which are accessible over a communication network 110. The internal sensors and/or external sensors may be, for example, sensors that detect the ambient noise decibel level, the surrounding temperature, the air pressure, and/or other characteristics of the ambient environment. The sensors provide data which the system may use to generate the visual montage.

Mobile device 104 may also include a data source 112 or be communicatively connected to data source 112. Data source 112 may store data that includes, for example, code for a visualization application 114. Data store 112 may store data 116 that indicates how to assemble the sublayers and/or rules for transition between states. Data store 112 may also store rules for user interaction. Data store 112 may store data associated with user preferences and user identities (e.g., identities of parties that may potentially view a visual montage).

Visualization application 114 may communicate with one or more servers over network 110 to obtain information associated with users. For example, visualization application 114 may communicate with a National Weather Service server 118 with a database 120 storing local and national weather data. Visualization application 114 may obtain the weather data for generating a visual montage.

Visualization application 114 may obtain social media information from social media server 122 and an associated database 124, and group activity information from a group activity server 126 and an associated database 128. Visualization application 114 may generate a visual montage based on the social media information and group activity information, and may also access other servers not depicted in FIG. 1 to obtain data for generating the visual montage.

The system may obtain and display different types of information from multiple sources. The types of information obtained may include, for example, weather information, ambient lighting information, social networking information, and group activity information. The system may also measure noise levels (e.g., decibel levels) from a microphone, such as a microphone in a conference room, and can determine an approximate number of people that are engaging in conversation or other activity. The system may also obtain and measure other sensor data, such as radio frequency chatter, or thermal effects, and represent the data on the visual montage. The system may also measure the number of people using WiFi hotspots and display this information so that users can find WiFi hotspots which are faster and less crowded. Furthermore, the system may take any information that can be organized in a graph and present that information with the visual montage.

Exemplary Applications

Ambient visualization montage technology is suitable for glance (wearable), burst (mobile), or environmental (desktop or wall display) interfaces. It can serve as a companion to analytics services and may address the needs of higher-level stake holders interested in big picture or system wellness views instead of the details. A user may use an ambient visualization montage to direct an initial search or to drill down into analytics based on display imagery. The visual montage provides a means for quick, efficient, and interactive information conveyance.

A visualization system may present a visual montage in different use case scenarios. The display screen presenting a visual montage can be, for example, a smartwatch, a mobile phone, a tablet, a large screen TV, or a billboard located on the side of a freeway. The billboard is one example of a glance interface where drivers typically only have a second to view the billboard while they are driving. For example, the visual montage presented on the display screen can indicate the number of fires or the number of crimes in a city over a range of time. A viewer can understand the gist of the information on the display screen with a quick glance of the screen.

In some embodiments, the visual montage may be utilized as a smart home ambient display. The visual montage can be a pleasing picture for residents and visitors to view, which is preferable to raw data or charts which may be visually less attractive in a home setting. The visual montage can indicate, for example, the state of the house, the state of the neighborhood, events within the neighborhood, and/or events within the user's social circles. The user may get a sense of activities within the ambient environment. Such ambient visualizations can be aesthetically pleasing and provide non-intrusive ambient environment state information to casual observers at a glance. The system may alert the user when necessary or provide a peace of mind when everything is operating as designed.

In some embodiments, the system may determine that a group in an organization and/or a geographic area with a number of security incidents exceeding a predetermined threshold may be mapped to a graphical object on the display. The system may place the graphical object on a layer corresponding to a time associated with the security incidents. The system may then present a visual montage that displays all of the security incidents in the organization at different times. When a user interacts with the visual montage (e.g., by touching or sliding a graphical object), the user can cause, for example, a door to lock or a computer to shut down. The system may also indicate security events that are coming up in the future by moving a graphical object representing the security event from a background layer to a foreground layer.

In some embodiments, along with selectively clustering information, the system may filter information from the ambient environment for display on the visual montage. In some embodiments, the system may cluster states, events, objects, and/or places that are physically and/or temporally closest to the viewer in the ambient environment. The system may then filter information based on preference and/or security data received from the user's mobile device. For example, the user's preference data may indicate that the user does not want personal information to be displayed on the visual montage. The system may then display only information that satisfies the user preferences. The system may obtain data (e.g., preference and/or security data) from the user's mobile device (or an electronic identification badge or any other electronic device) through a wireless (e.g., Bluetooth) connection. The system may obtain the information when the user's device comes within communication range of the computer controlling the display.

As the user moves from one location to another (e.g., such as moving from an entrance to a conference room of a campus of an organization), all devices displaying visual montages for the user may have the benefit of displaying material filtered according to the user's preference. The system may collect Global Positioning System (GPS) data and receive identification information from the user's electronic device (and/or electronic identification badge) to determine a nearest display screen for the user. In some embodiments, the display devices may be communicatively connected to a central computer which receives and stores the user's preferences from the user's electronic device, and the central computer may filter information from the ambient environment. By centralizing the data collection and filtering, the system improves the efficiency of collecting data from the user, and improves the efficiency of collecting and filtering data for display. The system need not collect data from the user's electronic device multiple times. This improves network efficiency by reducing network data usage and freeing bandwidth. The system need only store a single copy of the user's preference data to control and/or filter multiple displayed visual montages. This improves usage of storage space since it reduces storage space requirements.

Generating an Interactive Layered Visual Montage

Figure 2:
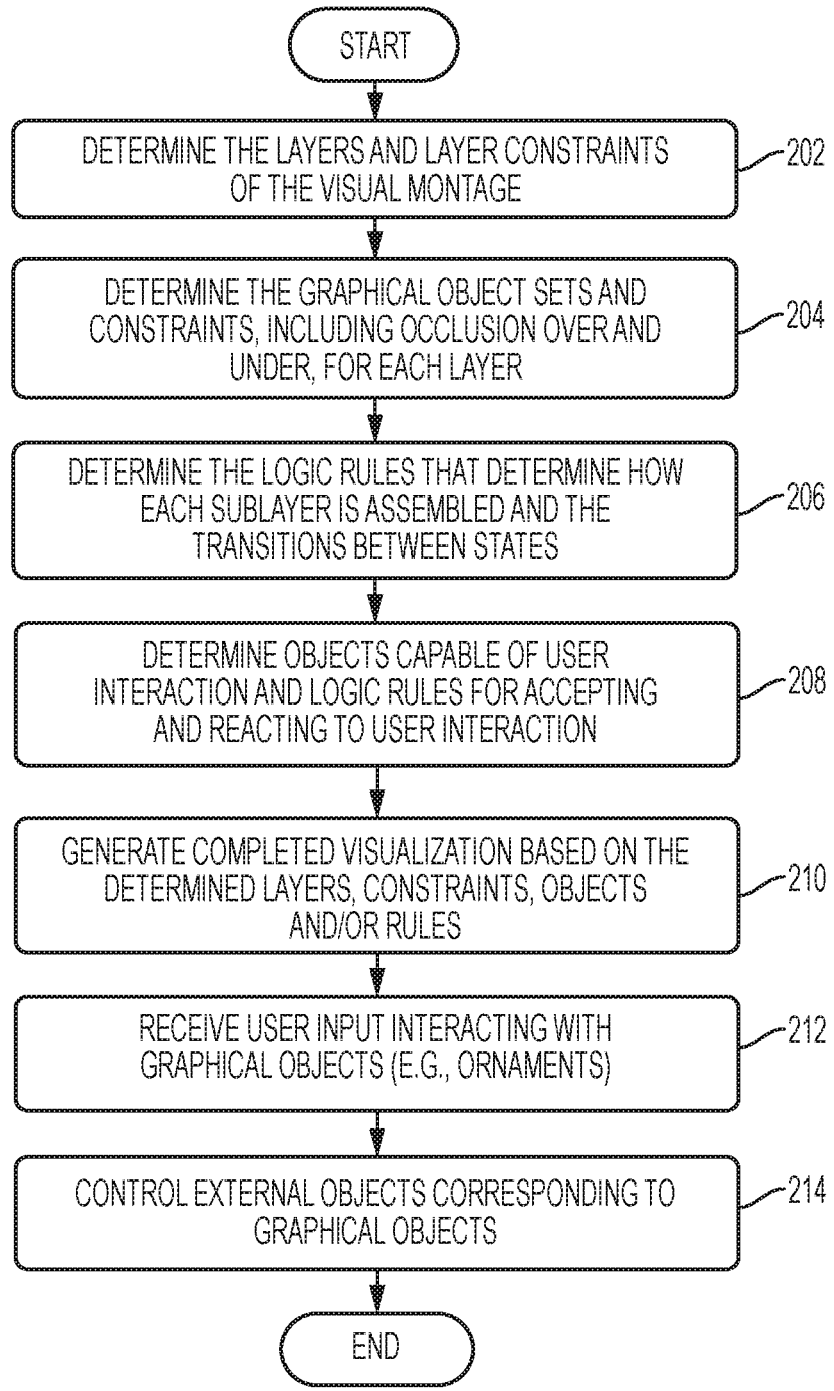
FIG. 2 presents a flowchart illustrating an exemplary method for generating a layered visual montage, in accordance with an embodiment.

FIG. 2 presents a flowchart illustrating an exemplary method for generating a layered visual montage and responding to user interaction, in accordance with an embodiment. Different embodiments may vary from the operations described below and embodiments of the present invention are not limited to the exemplary embodiment described below. In some embodiments, the system may perform the operations below in a different order or perform the actions described below for one operation in a different operation.

When performing the operations below, the system may determine the identity of the user (e.g., the party viewing the visual montage) and use configuration preferences associated with the user. Furthermore, the system may automatically perform operations 202-210 without user input, although users (e.g., administrators) can optionally configure various aspects of the operations. In some embodiments, the system may generate visual portions of the visual montage while simultaneously performing one or more of the operations below.

During operation, the system may determine the layers and layer constraints of the visual montage (operation 202). The system may design a layout to provide an appropriate aesthetic. The system may determine and/or generate images associated with the layers, and associate a time range with each layer. The system may define how narrative is conveyed across the layers. The system may also determine positions of ornament slots which can potentially be used to assign ornaments.

The system may determine the graphical object sets (e.g. ornaments) and constraints, including occlusion over and under, for each layer (operation 204). The system may define graphical object sets and constraints on graphical objects, and/or the placement of graphical objects within layers.

The system may design the graphical object sets using appropriate symbolic representation and aesthetic. The system may obtain image data associated with (e.g., representing) the graphical objects sets and constraints on the graphical objects. The system may generate imagery associated with graphical object sets which can be incorporated into the visual montages. The system may define the set of object transforms that can maximize the utility of each graphical object within and across layers. The system may also define how narrative is conveyed within a layer.

The system may determine conditions from the ambient environment that trigger the display of graphical objects or changes in graphical objects, and determine how to represent the conditions on the display. These conditions may be associated with events, activities, states, and/or any other information or concept. The system may determine the threshold range and granularity of the information from the ambient environment that is mapped to graphical objects on the display, including predetermined thresholds that trigger changes in the depiction of graphical objects in the visual montage. The system may determine a time associated with the events, activities, states, and/or other information or concept. The system may assign an ornament representing the events, activities, states, and/or other information or concept to a layer associated with the time, and the assignment may be based on constraints associated with the ornament and/or layer. Some layers may be associated with zero graphical objects.

The system may determine the types of information and threshold ranges for displaying information. For example, if the viewer is interested in activities, the system may display the number of people in common spaces such as an auditorium. The system may define a set of graphical objects, with different graphical objects corresponding to zero people in a group, a small number of people in a group, a medium size number of people in a group, and a large number of people in a group. The system may display a graphical object that most closely represents the actual number of people in the auditorium.

The system may determine the logic rules that determine how to assemble (e.g., generate) each sublayer and the transitions between states (operation 206). The logic rules may be stored in a data source, such as a database. The logic rules may specify how the sublayers and/or ornaments transition from one state to another. In some embodiments, the system may also obtain logic rules which determine how to assemble each layer and how the layers, sublayers, and/or ornaments transition from one state to another. In various embodiments, the system may also assign ornaments to ornament slots according to rules.

For example, the system may determine based on the rules how objects move on the display and how objects are grouped on the display. For example, the system may determine how a depiction of the sun moves across the display. In some embodiments, the system can use machine learning to learn the logic rules.

In another example, the system may determine rules for how an ornament shrinks in size on the visual montage based on data associated with the user's ambient environment. In one example rule, as time moves forward and a group activity is ending, the system may determine that an ornament representing the group activity shrinks in size and moves the ornament to a different layer.

The system may subsequently determine objects capable of user interaction and logic rules for accepting and reacting to the user interaction (operation 208). For example, the system may obtain rules that determine how to control a machine, a switch, or other object in response to receiving user interaction with an ornament or other object on the screen. For example, there may be rules to dim an overhead light (or some other light source) in response to receiving user input interacting with an object displayed on the screen (e.g., a visual depiction of a light source). For example, there may be rules to control the thermostat to raise the room temperature in response to receiving user input interacting with an object (e.g., a picture of a thermostat or thermometer) displayed on the screen.

In some embodiments, when the user interacts with a graphical object on the visual montage, the system may send a control signal to a real-world device to control (e.g., adjust or turn on) the device. After responding to the command from the control signal, the device may then send a responding signal to the system to indicate the state of the device. The system may then update a visual depiction (or representation) of the device on the visual montage.

The system may complete the generating of the visual montage based on the determined layers, constraints, objects, and/or rules (operation 210). In some embodiments, the system may generate displayable portions of the visual montage during one or more of the above operations. The system may present the generated visual montage on a display screen.

The system may display information that is personalized based on the preferences of each user. The system may learn the personal preferences of the user through machine learning or the user (e.g., an administrator) may configure the preference information. For example, the system may display ornaments associated with social information for a user that is interested in social activities. The system may display an ornament resembling three people in a group having a conversation in the middle ground layer to indicate that people of interest to the user are having a conversation. The system may display ornaments representing geography (e.g., a city) or an event that is relevant to the user. For example, the system may display an ornament representing a billboard with a picture of a person to indicate that there is a communication (e.g., through social media) from the person. The system may also display an ornament representing an airplane flying in the background with a trailing banner, and the banner may include a written message for the user.

The system may receive user input interacting with graphical objects (e.g. ornaments) (operation 212). For example, the system may receive user input interacting with a graphical object (e.g., a picture of a thermostat or thermometer) displayed on the screen.

The user need not touch the display screen to interact with the visual montage. In one example, when a visitor enters a building, the system may detect an electronic identification badge that the visitor is wearing and determine the visitor's preferences based on the visitor's identity. The system may adjust a visual montage displayed on a large flat-panel display screen for the visitor. When the visitor glances at the display screen, the visitor views information of interest to the visitor. The system may subsequently adjust the display screen for the next visitor to the building.

The system may control external objects corresponding to graphical objects (operation 214). An external object is any object outside of the visual montage, such as real-world objects or digital objects displayed or stored elsewhere. For example, the system may control a thermostat to raise the room temperature in response to receiving user input interacting with an object (e.g., a picture of a thermostat or thermometer) displayed on the screen. The system may control switches, machines, adjustable devices, and/or any other external (e.g., real-world) object communicatively connected to or accessible by the system. For example, the user may touch an ornament representing a device (e.g., a lamp) to turn off the device (e.g., a lamp light that is located in the user's room). The lamp light may be connected over a network to a computing device displaying the visual montage. For example, the user may touch an ornament representing a sun to adjust the temperature in the user's room.

Exemplary Layered Visual Montage

Figure 3:
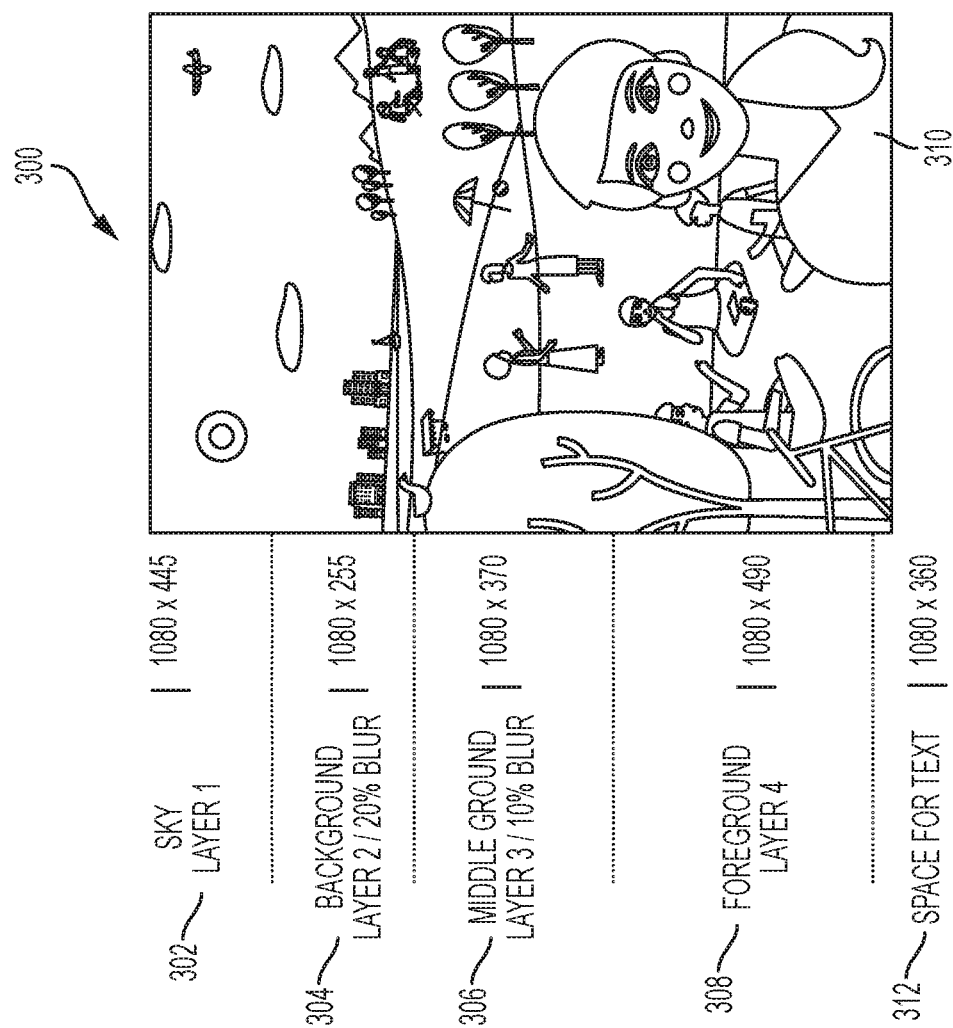
FIG. 3 illustrates a block diagram illustrating an exemplary layered visual montage, in accordance with an embodiment.

FIG. 3 presents a block diagram 300 illustrating an exemplary layered visual montage, in accordance with an embodiment. In an example scenario, the system may generate an ambient visualization in a mobile application to convey physical and conversational activities of a social team. The design specifications for the mobile application and example screenshots from the mobile application may be as described below.

The visualization for the visual montage may include six layers such as a sky layer 302, a background layer 304, a middle ground layer 306, a foreground layer 308, a meteorology layer, and a coach layer 310. Coach layer 310 may appear starting at foreground layer 308 and reach into the other layers. There may be a space for text 312 at the bottom of the screen.

Each layer may include a set of background environments that contain one or more ornament sites. An ornament is a sub-element that can be composited in different combinations onto the environment so as to reflect a state. The system may convey time by moving ornaments from the foreground layer through the middle layer to the background layer. Even though the characters may migrate through different environments on their journey, the characters presented in the foreground should be the same as the characters that end up in the background at the end of the journey. This is intended to make the user aware of the characters' state and the passage of time as the characters move into the distance. The various layers of the example visualization are described below.

Sky layer 302 may include environments for night, dawn, day, dusk, day with stormy sky, and/or evening/morning with stormy sky.

Ornaments displayed in the visualization may include, for example, clouds, the sun, the moon, thunderclouds, and lightning. Clouds may move slowly across the sky from left to right at variable speeds with density equivalent to current user weather conditions reported from a weather service. The sun may transit in a parabolic arc based upon the local time of day. This is intended to mimic the local sun transit at the user's location. The moon may transit in a parabolic arc based upon the local time of night. This is intended to mimic the local moon transit at the user's location. Thunderclouds may move like clouds when the weather service reports impending storms. Lightning may appear at random when the weather service reports storms.

Background, middle ground, and foreground layers may contain multiple environments for night, dawn, day, dusk, day stormy sky, and/or evening/morning stormy sky. The system may display these environments at the appropriate local time to the user to reflect local state.

Ornaments may include, for example, representations resembling conversation groups and activity performing groups, peer contact indicators, new data indicators, humorous but specific indicators, and holiday scenes.

Conversation group ornaments may reflect conversation activity from the user's environment. For example, the visualization may include a conversation group representing 1, 2, 3, or 6 people participating in a conversation.

Activity performing group ornaments may reflect fitness activity from the user's environment. For example, the visualization may include an activity performing group with 1, 2, 3, or 6 people participating in the activity.

Peer contact indicators may signal when another user is contacting the user. For example, a peer contact indicator may include a face on a billboard, a face on a banner trailing a plane, and/or a face on a sign carried by a person.

New data indicators may include, for example, charts or other presentations of data. For example, a chart may indicate users attempting to contact the user.

Funny but specific indicators may include, for example, crickets depicted in a field representing quiet time, a planted field that grows with each step when nothing is happening, and/or zombies around the time of Halloween.

Holiday Scenes may include, for example, New Year's celebrations (US, China, etc), Valentine's Day, Veteran's Day, St. Patrick's Day, Easter, 4th of July, Thanksgiving, and/or Christmas.

Figure 4:
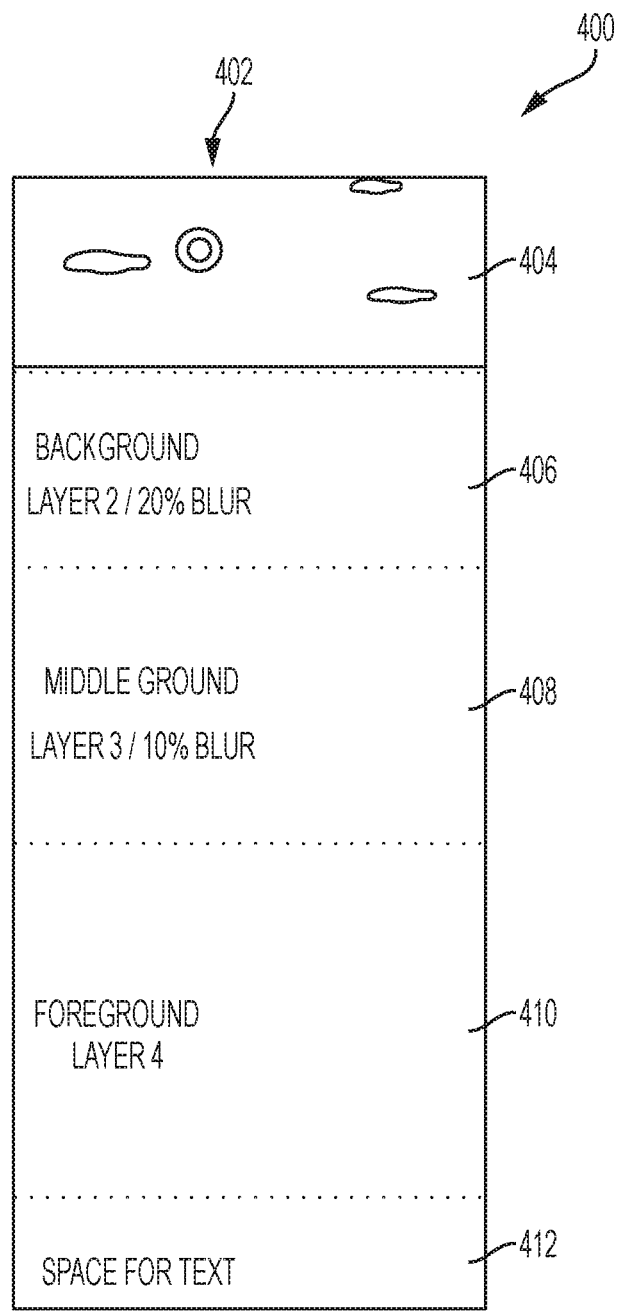
FIG. 4 illustrates a block diagram illustrating exemplary layers for the visual montage, in accordance with an embodiment.

FIG. 4 presents a block diagram 400 illustrating the exemplary layers of a visual montage, in accordance with an embodiment.

FIG. 4 depicts the labels for multiple layers 402 of a visual montage with a sky layer 404. As illustrated in FIG. 4, there may be sky layer 404, a background layer 406, a middle ground layer 408, and a foreground layer 410. There may also be space for text 412 at the bottom of the display.

Figure 5:
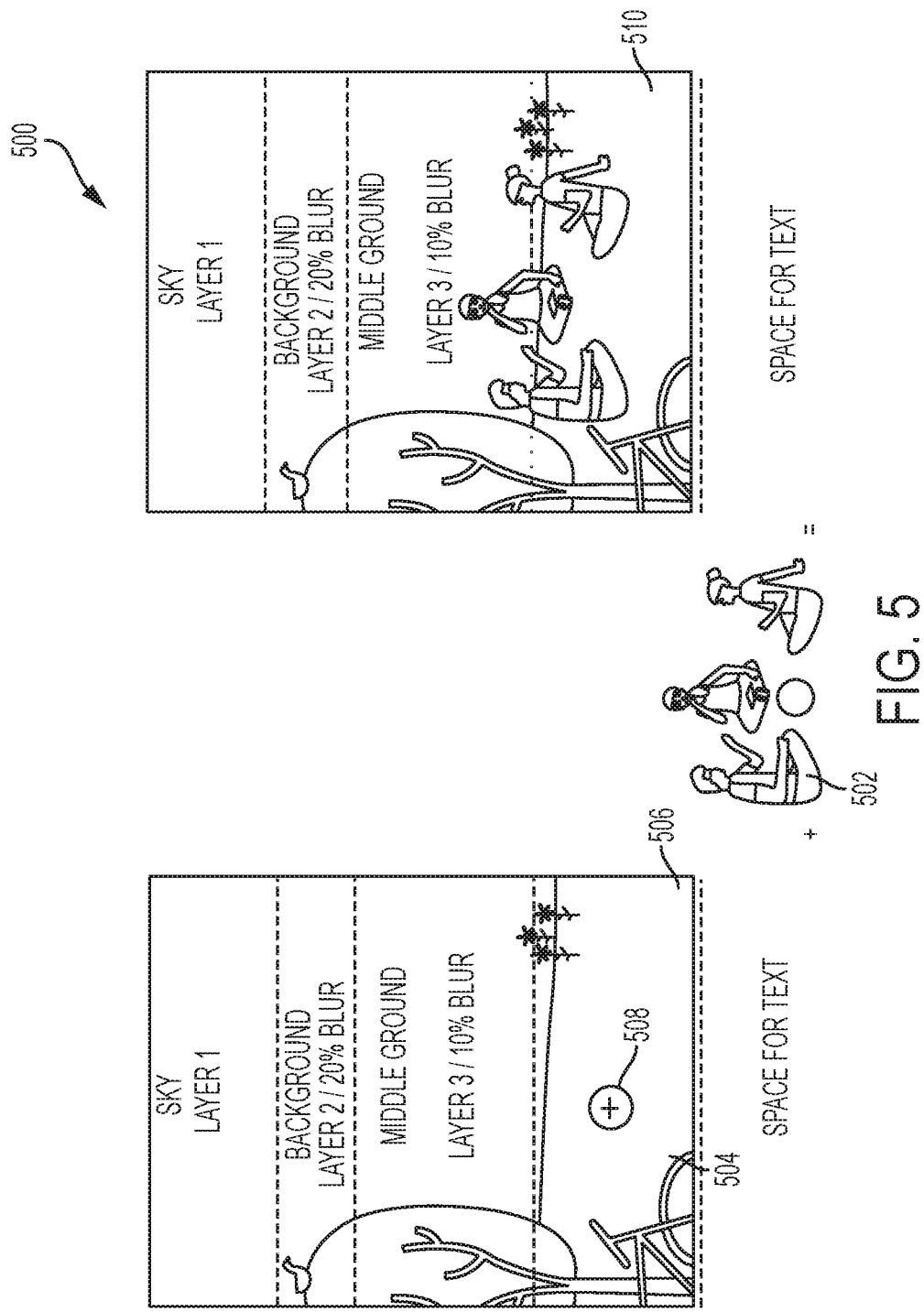
FIG. 5 presents a block diagram illustrating an exemplary visual montage with a conversation group ornament, in accordance with an embodiment.

FIG. 5 presents a block diagram 500 illustrating an exemplary visual montage with a conversation group ornament, in accordance with an embodiment. As illustrated in FIG. 5, the system may add an ornament 502 representing a group conversation to a foreground layer 504 of a visual montage without any ornaments 506. The system may add ornament 502 at a location indicated by an ornament slot 508. By adding ornament 502 to the visual montage without any ornaments 506, the system generates a visual montage 510. When a user views visual montage 510, the user will understand that there is an ongoing group conversation.

Figure 6:
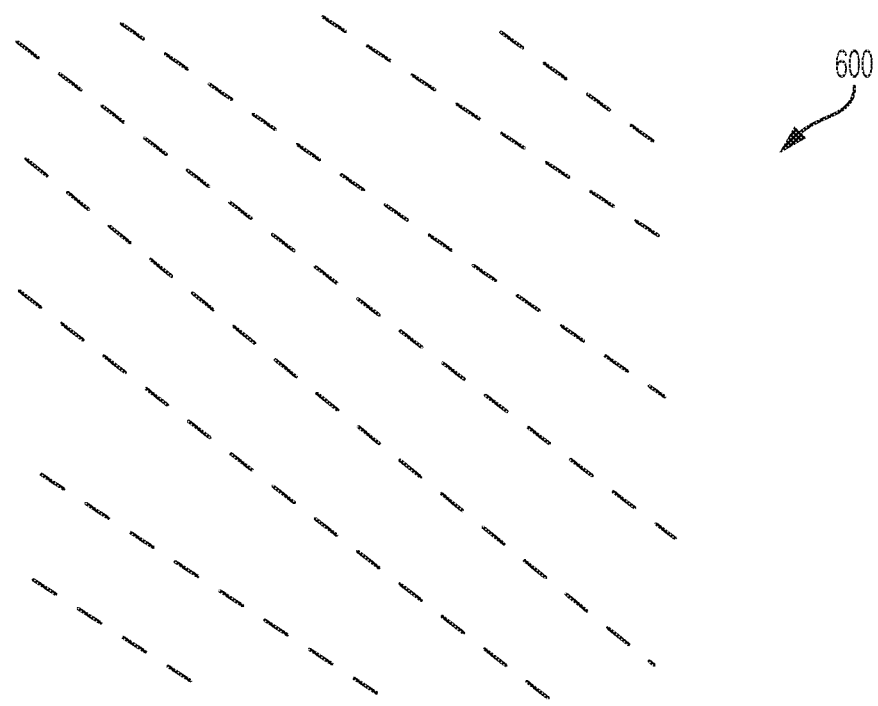
FIG. 6 presents a block diagram illustrating an exemplary meteorology layer (light rain in this instance), in accordance with an embodiment.

FIG. 6 presents a block diagram 600 illustrating an exemplary meteorology layer (light rain in this instance), in accordance with an embodiment. The meteorology layer may contain whole page layover elements as depicted in FIG. 6 representing rain (e.g., light, medium, heavy, blowing, and/or blowing hard) or snow. For example, the weather depicted in FIG. 6 is light rain. The system may depict the weather according to local weather reports.

Figure 7:
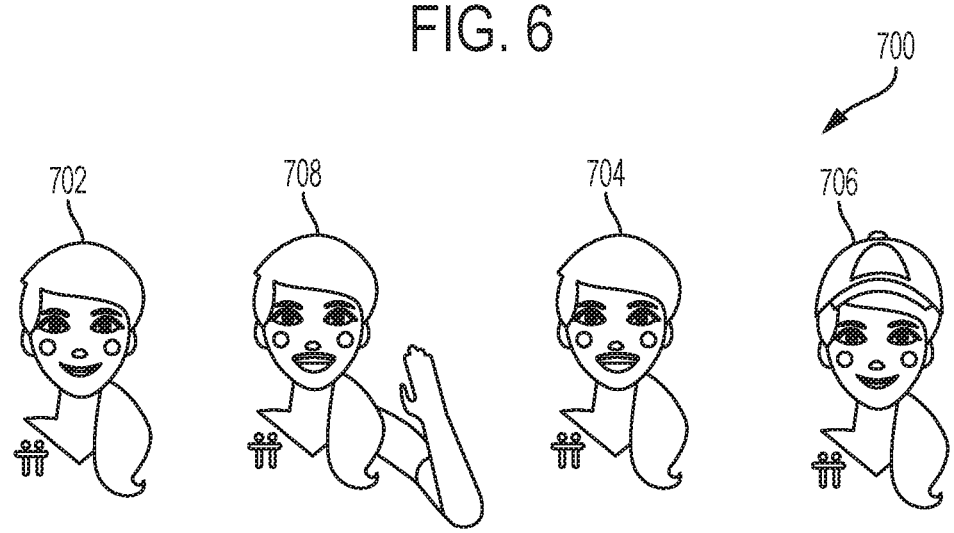
FIG. 7 presents a block diagram illustrating an exemplary depiction of a coach, in accordance with an embodiment.

FIG. 7 presents a block diagram 700 illustrating an exemplary depiction of a coach, in accordance with an embodiment. The coach layer may include a depiction of a coach in either the female or male form with one of the following poses: 1) friendly, general pose 702; 2) presenting a reminder 704; 3) drawing attention to a key item; 4) deep coaching mode (with hat) 706; 5) emphasizing something important; 6) cautionary; and 7) stopping the user 708.

All of the above poses should have active talking and mouth closed versions. The pose may depend on the information the coach is conveying in the message area.

Compositing Order

Figure 8:
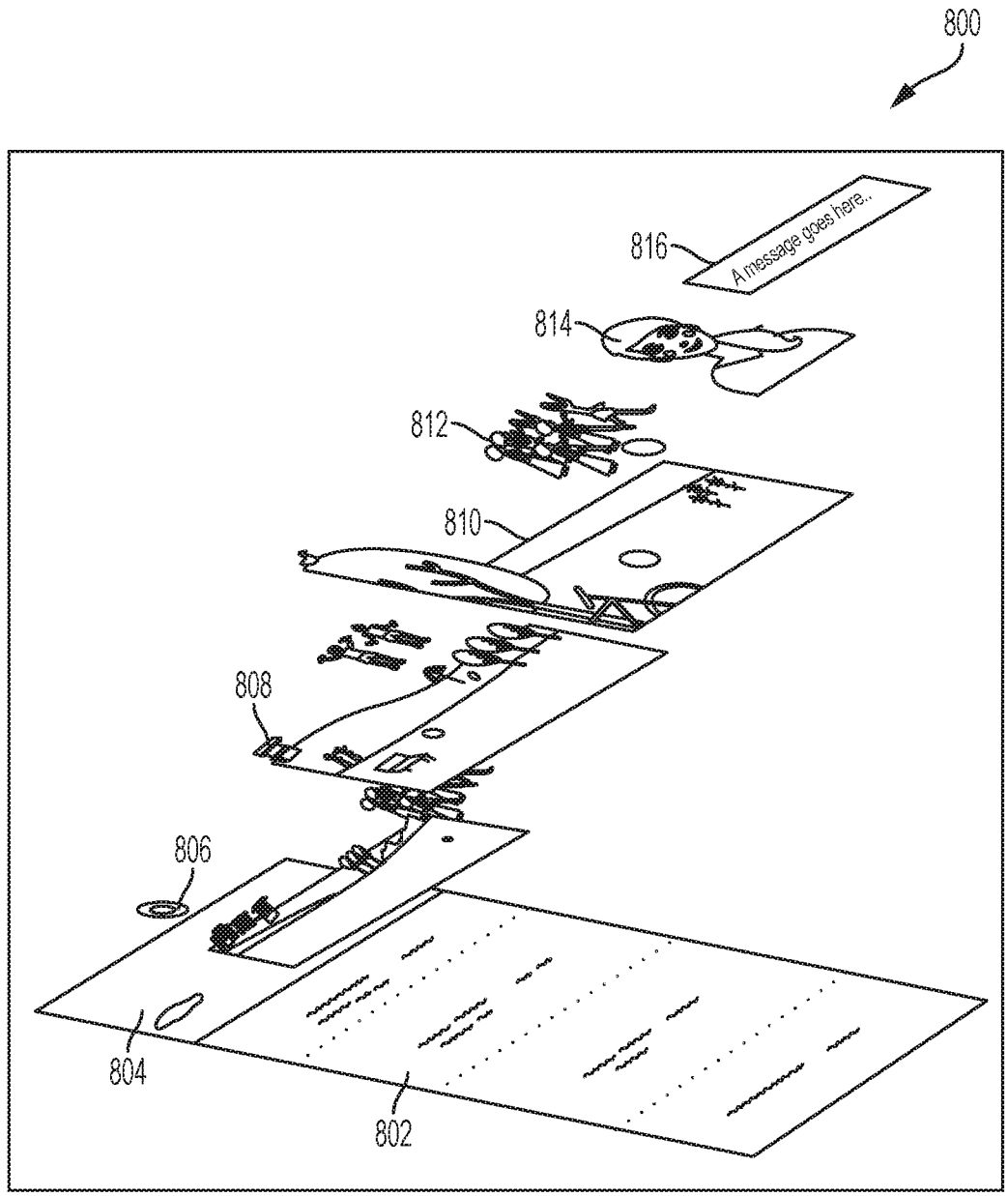
FIG. 8 presents a block diagram illustrating an exploded view of the layers of a visual montage, in accordance with an embodiment.

FIG. 8 presents a block diagram 800 illustrating an exploded view of the layers of a visual montage, in accordance with an embodiment. The diagram illustrates the layers as they would appear if expanded out. A base layer 802 includes a blue sky 804 and a position of a sun 806 which represents the time of day. The sun may move during the daytime according to the time of day. Hillsides 808, 810 depicted in the layers are associated with the time ranges of the respective layers. An ornament 812 indicates a group of people participating in an activity. Also, a coach 814 is communicating a message 816 to the user.

The system may composite the images in layer order from 1 to 6 after internal layer compositing. When composited into a montage the layers create the visualization of FIG. 9.

Figure 9:
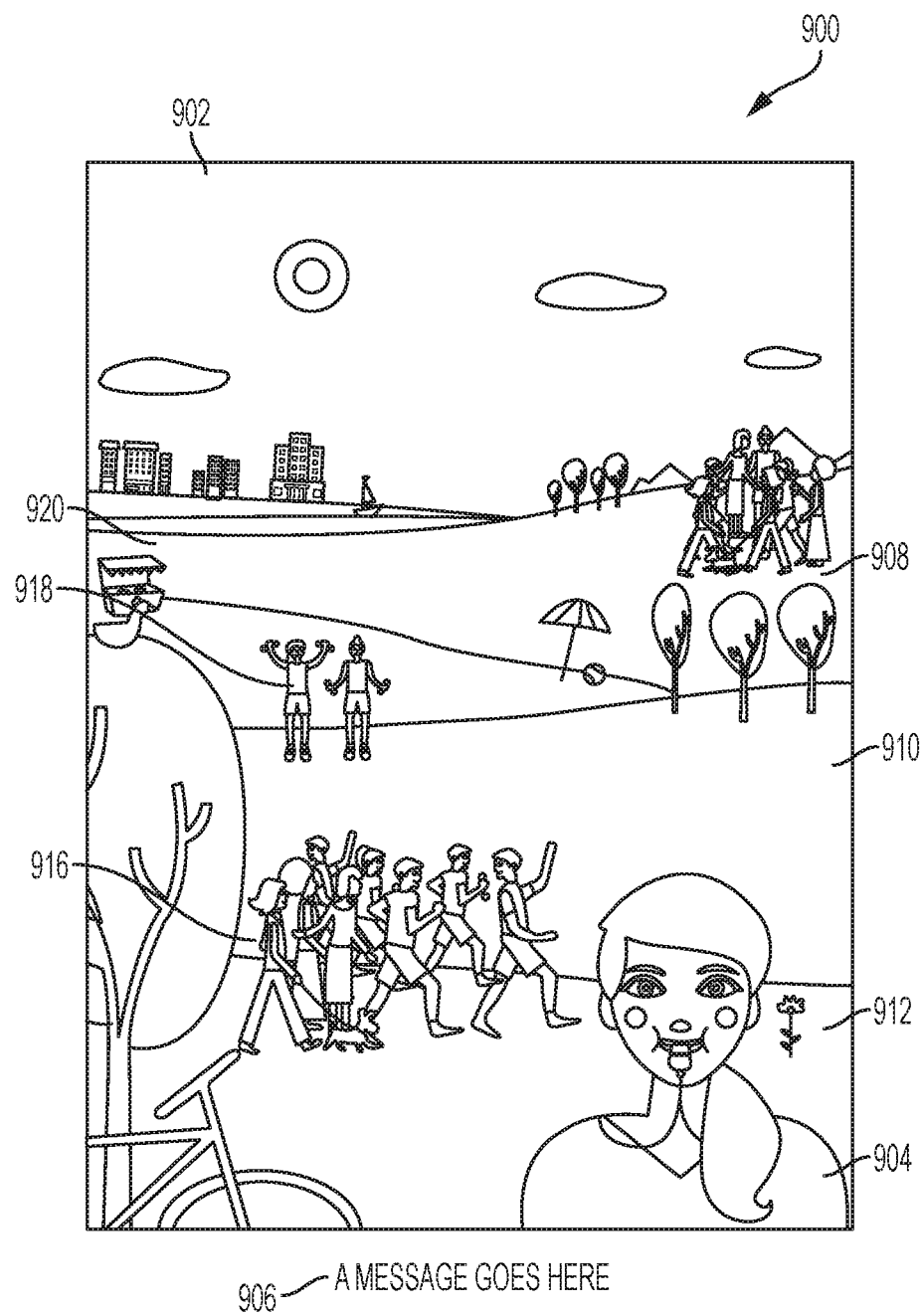
FIG. 9 presents a block diagram illustrating a visual montage generated by compositing multiple layers, in accordance with an embodiment.

FIG. 9 presents a block diagram 900 illustrating a visual montage generated by compositing multiple layers, in accordance with an embodiment. FIG. 9 illustrates an example screenshot 902 from a fitness coaching application (e.g., Fittle). The information depicted in the visual montage is assembled from gathered data and spread over 10 layers. The screenshot depicts a coach 904 at the foreground layer and extending into the other layers. The coach is communicating a message 906 to the user. In some embodiments, the system may use rules to control animation of the coach speaking to the user. For example, the rules may control the coach speaking a parameterized sentence, with the parameters derived from data associated with the user's ambient environment. The system may run the sentence through a text-speech translator.

Hillsides 908, 910, 912 are associated with the layers of the visual montage and the hillsides indicate the time frames of the activities depicted in association with the hillsides.

An ornament 916 representing a group of people indicates to the viewer that the people are performing a walking activity. Another ornament 918 representing two people indicates to the viewer that the two people are doing exercises by lifting small weights. Together the ornaments indicate that more people are doing activities now than in the past. A blank hillside 920 indicates that nobody was performing an activity in the associated timeframe.

When the system presents the visual montage, this may encourage the user to become more engaged in activities.

Exemplary Apparatus

Figure 10:
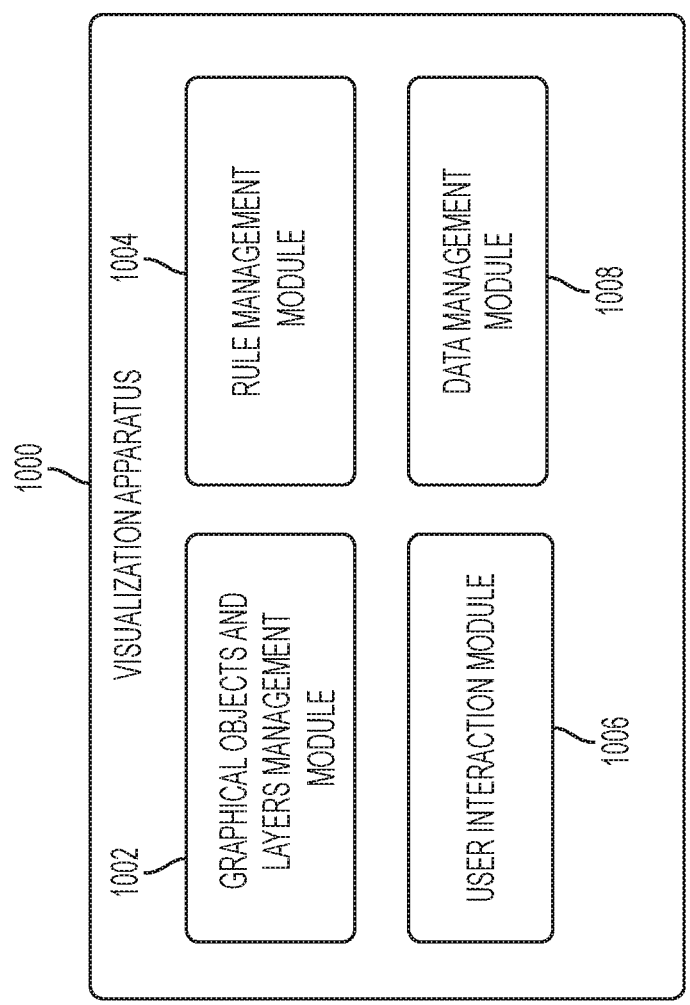
FIG. 10 presents a block diagram illustrating an exemplary apparatus for generating and displaying a layered visual montage, in accordance with an embodiment.

FIG. 10 presents a block diagram illustrating an exemplary visualization apparatus 1000, in accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices.

Specifically, apparatus 1000 can comprise any combination of a graphical objects and layers management module 1002, a rule management module 1004, a user interaction module 1006, and a data management 1008. Note that apparatus 1000 may also include additional modules and data not depicted in FIG. 10, and different implementations may arrange functionality according to a different set of modules. The embodiments disclosed herein are not limited to any particular arrangement of modules.

Some implementations may include graphical objects and layers management module 1002 which may perform operations including determining the graphical objects and the layers of a visual montage. Graphical objects and layers management module 1002 may also manage the graphical objects in storage. Rule management module 1004 may obtain and manage the rules that determine how sublayers are assembled and rules that define transitions between states. Rule management module 1004 may also obtain and manage rules for reacting to user interaction. User interaction module 1006 may execute specific functions according to the rules for reacting to user interaction. For example, a function may increase the temperature of a room by controlling a thermostat. Data management module 1008 may manage data, including user preference data. Data management module 1008 may also obtain data from social media servers and any other servers.

Exemplary System

Figure 11:
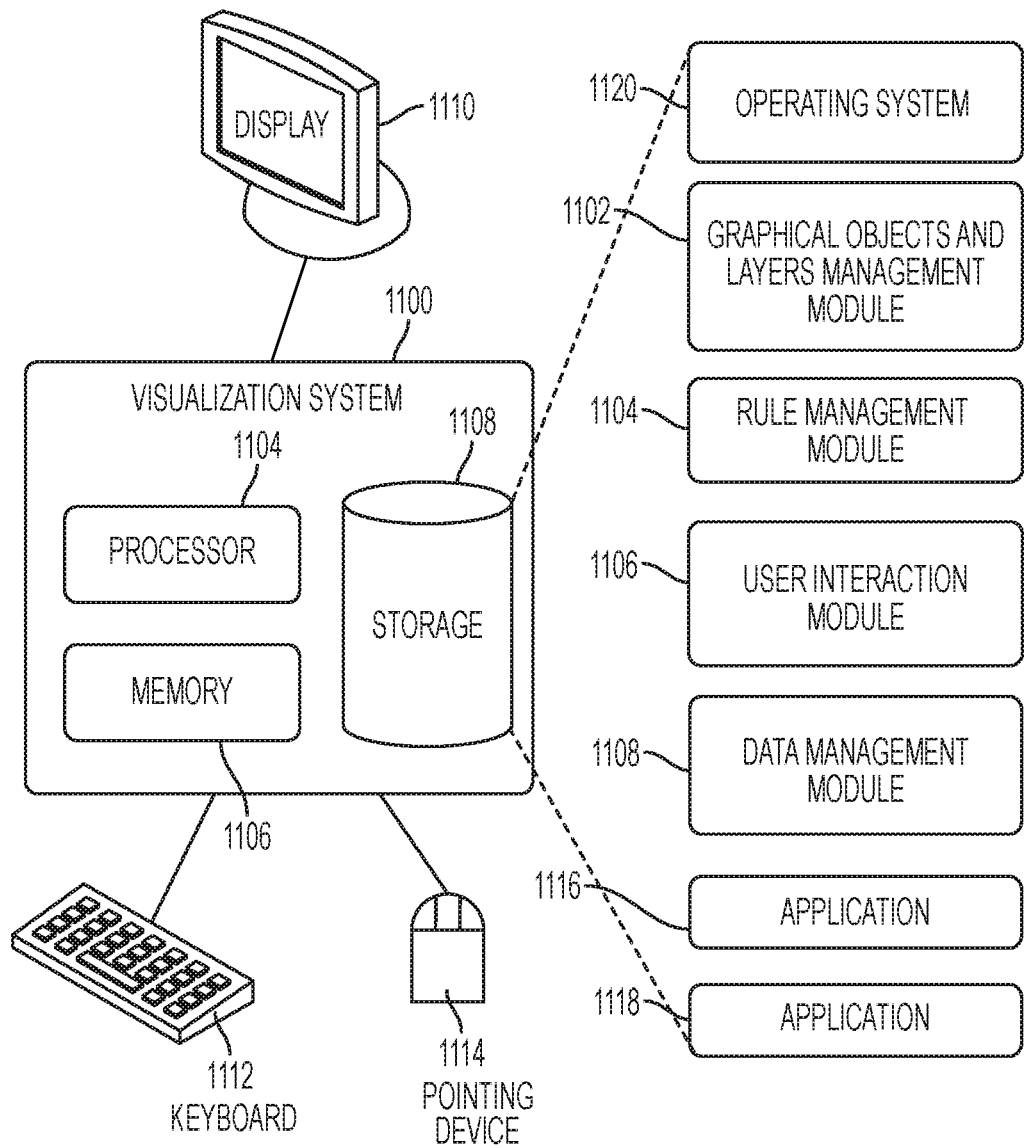
FIG. 11 illustrates an exemplary computer and communication system that generates and displays a layered visual montage, in accordance with an embodiment.

FIG. 11 illustrates an exemplary visualization system 1100, in accordance with an embodiment. A visualization system 1102 includes a processor 1104, a memory 1106, and a storage device 1108. Memory 1106 can include a volatile memory (e.g., RAM) that serves as a managed memory, and can be used to store one or more memory pools. Furthermore, computer and communication system 1102 can be coupled to a display device 1110, a keyboard 1112, and a pointing device 1114.

Storage device 1108 can store a number of applications, such as applications 1116 and 1118 and operating system 1120. Storage device 1108 may also store code for a graphical objects and layers management module 1102, a rule management module 1104, a user interaction module 1106, and a data management 1108. Graphical objects and layers management module 1102 may perform operations including determining the graphical objects and the layers of a visual montage. Graphical objects and layers management module 1102 may also manage the graphical objects in storage. Rule management module 1104 may obtain and manage the rules that determine how sublayers are assembled and rules that define transitions between states. Rule management module 1104 may also obtain and manage rules for reacting to user interaction. User interaction module 1106 may execute specific functions according to the rules for reacting to user interaction. For example, a function may increase the temperature of a room by controlling a thermostat. Data management module 1108 may manage data, including user preference data. Data management module 1108 may also obtain data from social media servers and any other servers.

During operation, one or more applications, such as graphical objects and layers management module 1102, are loaded from storage device 1108 into memory 1106 and then executed by processor 1104. While executing the program, processor 1104 performs the aforementioned functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for generating a visual montage, the method comprising:

determining a plurality of layers in the visual montage, wherein a respective layer is associated with a time range and a plurality of predetermined slots for assigning graphical objects;

obtaining data representing a set of graphical objects and constraints associated with the graphical objects;

obtaining information associated with an event and a respective time from an ambient environment of a user;

determining that the respective time is within the time range of a specific layer;

assigning at least one graphical object to the specific layer according to the constraints associated with the graphical object to generate the visual montage; and displaying the visual montage with the graphical object representing the event on a display screen.

2. The method of claim 1, further comprising:

determining rules which specify responses to user interaction with one or more graphical objects; and in response to receiving user input interacting with a selected graphical object, executing a rule associated with the selected graphical object to provide a response to the user.

3. The method of claim 1, further comprising:

in response to receiving user input interacting with a selected graphical object, controlling a device represented by the graphical object.

4. The method of claim 1, further comprising:

in response to determining a change in a time associated with a specific graphical object, moving the graphical object to another layer of the visual montage.

5. The method of claim 1, wherein the plurality of layers includes at least a foreground layer and a background layer, the foreground layer is associated with a most recent time range, and the background layer is associated with a least recent time range.

6. The method of claim 5, further comprising:

in response to determining that a difference between a current time and a time associated with a second event is decreasing, moving a second graphical object from another layer to the foreground layer; and in response to determining that a difference between the current time and a time associated with the second event is increasing, moving the second graphical object from the foreground layer to a different layer.

7. The method of claim 1, further comprising:

assigning at least one graphical object to an ornament slot associated with a layer.

8. The method of claim 1, further comprising:

determining rules which specify how to transition between states for a sublayer of a respective layer.

9. The method of claim 1, further comprising:

receiving user preference data indicating a type of information to display on the visual montage, wherein the information is associated with at least one of an event, an activity, a deadline, a user-specified logic function, and a communication from an application.

10. The method of claim 1, further comprising:

performing at least one of a temporal-to-spatial mapping, a spatial-to-spatial mapping, and a logical-function-to-spatial mapping from information associated with the ambient environment to the visual montage.

11. A computing system for generating a visual montage, the system comprising:

one or more processors, a non-transitory computer-readable medium coupled to the one or more processors having instructions stored thereon that, when executed by the one or more processors, cause the one or more processors to perform a method, the method comprising:

determining a plurality of layers in the visual montage, wherein a respective layer is associated with a time range and a plurality of predetermined slots for assigning graphical objects;

obtaining data representing a set of graphical objects and constraints associated with the graphical objects;

obtaining information associated with an event and a respective time from an ambient environment of a user;

determining that the respective time is within the time range of a specific layer;

assigning at least one graphical object to the specific layer according to the constraints associated with the graphical object to generate the visual montage; and displaying the visual montage with the graphical object representing the event on a display screen.

12. The system of claim 11, wherein the method further comprises:

determining rules which specify responses to user interaction with one or more graphical objects; and in response to receiving user input interacting with a selected graphical object, executing a rule associated with the selected graphical object to provide a response to the user.

13. The system of claim 11, wherein the method further comprises:

in response to receiving user input interacting with a selected graphical object, controlling a device represented by the graphical object.

14. The system of claim 11, wherein the plurality of layers includes at least a foreground layer and a background layer, the foreground layer is associated with a most recent time range, and the background layer is associated with a least recent time range.

15. The system of claim 14, wherein the method further comprises:

in response to determining that a difference between a current time and a time associated with a second event is decreasing, moving a second graphical object from another layer to the foreground layer; and in response to determining that a difference between the current time and a time associated with the second event is increasing, moving the second graphical object from the foreground layer to a different layer.

16. A non-transitory computer-readable storage medium storing instructions that when executed by a computer cause the computer to perform a method for generating a visual montage, the method comprising:

determining a plurality of layers in the visual montage, wherein a respective layer is associated with a time range and a plurality of predetermined slots for assigning graphical objects;

obtaining data representing a set of graphical objects and constraints associated with the graphical objects;

obtaining information associated with an event and a respective time from an ambient environment of a user;

determining that the respective time is within the time range of a specific layer;

assigning at least one graphical object to the specific layer according to the constraints associated with the graphical object to generate the visual montage; and displaying the visual montage with the graphical object representing the event on a display screen.

17. The computer-readable storage medium of claim 16, wherein the method further comprises:

in response to receiving user input interacting with a selected graphical object, controlling a device represented by the graphical object.

18. The computer-readable storage medium of claim 16, wherein the plurality of layers includes at least a foreground layer and a background layer, the foreground layer is associated with a most recent time range, and the background layer is associated with a least recent time range.

19. The computer-readable storage medium of claim 18, wherein the method further comprises:
   in response to determining that a difference between a current time and a time associated with a second event is decreasing, moving a second graphical object from another layer to the foreground layer; and
   in response to determining that a difference between the current time and a time associated with the second event is increasing, moving the second graphical object from the foreground layer to a different layer.

20. The computer-readable storage medium of claim 16, wherein the method further comprises:
   assigning at least one graphical object to an ornament slot associated with a layer.

* * * * *